US006819962B1

(12) United States Patent
Bailey

(10) Patent No.: US 6,819,962 B1
(45) Date of Patent: Nov. 16, 2004

(54) METHOD OF EVALUATING, EXPANDING, AND COLLAPSING CONNECTIVITY REGIONS WITHIN DYNAMIC SYSTEMS

(75) Inventor: David A. Bailey, Schenectady, NY (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 184 days.

(21) Appl. No.: 10/309,286

(22) Filed: Dec. 4, 2002

(51) Int. Cl.[7] .............................................. G05B 11/01
(52) U.S. Cl. ............................. 700/27; 700/9; 700/26; 700/28; 700/47; 700/282; 700/289; 706/19; 706/20
(58) Field of Search .......................... 700/9, 26–28, 700/47, 282, 289; 706/19, 20

(56) References Cited

U.S. PATENT DOCUMENTS

| | | | | |
|---|---|---|---|---|
| 5,979,800 A | * | 11/1999 | Takagi ........................ 239/440 |
| 6,314,986 B1 | * | 11/2001 | Zheng et al. ............... 137/240 |
| 6,591,614 B2 | * | 7/2003 | Smith et al. ................... 62/3.1 |
| 6,714,299 B2 | * | 3/2004 | Peterson et al. ............ 356/338 |
| 2001/0029979 A1 | * | 10/2001 | Zheng et al. ............... 137/240 |

* cited by examiner

*Primary Examiner*—Ramesh Patel
(74) *Attorney, Agent, or Firm*—Richard A. Morgan; Paul A. Gottlieb

(57) ABSTRACT

An automated process defines and maintains connectivity regions within a dynamic network. The automated process requires an initial input of a network component around which a connectivity region will be defined. The process automatically and autonomously generates a region around the initial input, stores the region's definition, and monitors the network for a change. Upon detecting a change in the network, the effect is evaluated, and if necessary the regions are adjusted and redefined to accommodate the change. Only those regions of the network affected by the change will be updated. This process eliminates the need for an operator to manually evaluate connectivity regions within a network. Since the automated process maintains the network, the reliance on an operator is minimized; thus, reducing the potential for operator error. This combination of region maintenance and reduced operator reliance, results in a reduction of overall error.

18 Claims, 13 Drawing Sheets

METHOD OF EVALUATING, EXPANDING, AND COLLAPSING CONNECTIVITY REGIONS WITHIN DYNAMIC SYSTEMS

GOVERNMENT SUPPORT

This invention was made with government support under contract number DE-AC 12-76SN00052 awarded by the Department of Energy. The government may have certain rights in this invention.

BACKGROUND OF THE INVENTION

1. Field of the Invention

This invention relates to connectivity and network analysis within dynamic systems. More specifically, this invention detects and defines connectivity regions within dynamically changing fluid, power distribution, computer networks, or other flow distribution networks by defining an initial connectivity region, detecting changes in the status quo, and subsequently adjusting the region by collapsing or expanding to maintain network integrity.

2. Description of Related Art

Network operators often perform several functions on networks, such as, operating procedures, executing tests or performing maintenance. In order to efficiently perform these functions, network operators must know which network components are connected and which are isolated. Further, during development of operating procedures and maintenance plans, information about component connectivity is vital to ensure those procedures and plans are properly conceived.

For example, a simple plumbing network consists of various components, e.g., pipes, shutoff valves, faucets, and drains. Procedures are performed on the network during various times, e.g., filling a sink, draining a tub, watering the lawn. Similarly, maintenance, such as replacing a faucet, is also performed on the network. In order to complete a task, the operator of a plumbing system must know what impact a particular action will have on the system.

Procedures include various implied orders that must be executed in order to obtain a desired result. In the plumbing network, in order to fill a sink, the following implied orders are executed: open the main shutoff valve; open shutoff valves for the sink; close the drain; open the faucet; and once the sink is filled to the desired level, turn the faucet off. While verbatim compliance is not necessary to achieve the desired results, all implied orders associated with filling a sink must be eventually accomplished. One operator may shut the drain before opening the faucet while another operator may decide to open the faucet then shut the drain. Similarly, some implied orders may have already been accomplished and thus need not be performed, such as opening the main shutoff valve.

Unlike a simple plumbing network, industrial and commercial networks can be extremely complicated, consisting of multiple, dependent systems and subsystems. Such intricate networks result in operation, testing and maintenance procedures that require verbatim execution from an operator. In a complex network, a procedure may apply only to a small portion, or region, of the entire network. In these instances, an operator may simultaneously execute two or more procedures. However, network operators must have identified those regions of the network that are isolated and those regions that are interconnected.

One method of monitoring the different regions is the use of a network diagram. An operator spreads a schematic diagram of the entire network on a table, places Plexiglas™ over top, then with a grease pencil, traces the initial state of the network onto the Plexiglas™. The operator now uses the Plexiglas™ copy of the network to denote which components fall within a specific region. This is called the connectivity region. Depending on the state of the system there may be one or more connectivity regions.

Given the dynamic nature of networks, the connectivity regions need constant updating as the region's boundaries fluctuate. If the state of a region changes such that a component previously bounding a region changes, then the region expands until new boundaries are defined. Conversely, when a connectivity region has a component previously wholly within a region that now serves as a boundary for the region, the region must collapse and each network component must be reevaluated to determine whether it continues to remain within the new connectivity region.

For the operator tracking changes on Plexiglas™, maintaining the regions can be very difficult When a region is reduced, the operator decides which components will remain within the region and which will be removed and makes the appropriate annotation on the Plexiglas™. Similarly, as the number of components within a region increases, each additional component requires the operator to again redefine the region. Typically, such refinement requires the operator to completely erase and redraw the entire network. Usually, records of changes in the connectivity regions are not maintained before the Plexiglas™ is erased.

The current methods create a significantly higher potential for operator error. The consequences of which are, but not limited too: catastrophic failure within the network; inability to provide service; equipment damage; and personal injury.

The need therefore exists for a method of defining a region, detecting changes and expanding or collapsing a region; but with the use of an automated means that continuously monitors the current state of the network, recognizing changes and adjusting by expanding or collapsing. Additionally, the present invention maintains network history providing improved reliability and integrity over manual methods.

SUMMARY OF THE INVENTION

It is therefore an advantage of the present invention to provide an automated process for defining and maintaining connectivity regions within a dynamic network. This advantage eliminates the need for an operator to manually evaluate connectivity regions within a network. Since the present invention maintains the network, the reliance on an operator is minimized; thus, reducing the potential for operator error. This combination of region maintenance and reduced operator reliance, results in a reduction of overall error.

The automated process of the present invention requires an initial input of a network component around which a connectivity region will be defined. The present invention automatically and autonomously generates a region around the initial input, stores the region's definition, and monitors the network for a change. Upon detecting a change in the network, the effect is evaluated, and if necessary the region is adjusted and redefined to accommodate the change. Only those regions of the network affected by the change will be updated.

This invention presents a major breakthrough in network analysis. These advantages are based on the capability to respond efficiently and instantaneously to changes in the network. This invention can be generally applied to any dynamic network such as computer networks and power distribution networks; however, to provide an example the aforementioned simple plumbing system will be used throughout the detailed description below.

These advantages and other novel features of the present invention will become apparent in the following detailed description of the invention when considered in conjunction with the accompanying drawings.

BRIEF DESCRIPTIONS OF THE DRAWINGS

A better understanding of the present invention will be had when reference is made to the accompanying drawings, wherein identical parts are identified by identical reference numbers and wherein.

DETAILED DESCRIPTION OF THE PRESENT INVENTION

FIGS. 1–5 detail the process and individual processes that the present invention undergoes in order to maintain connectivity regions within a dynamic network.

Figure 1:
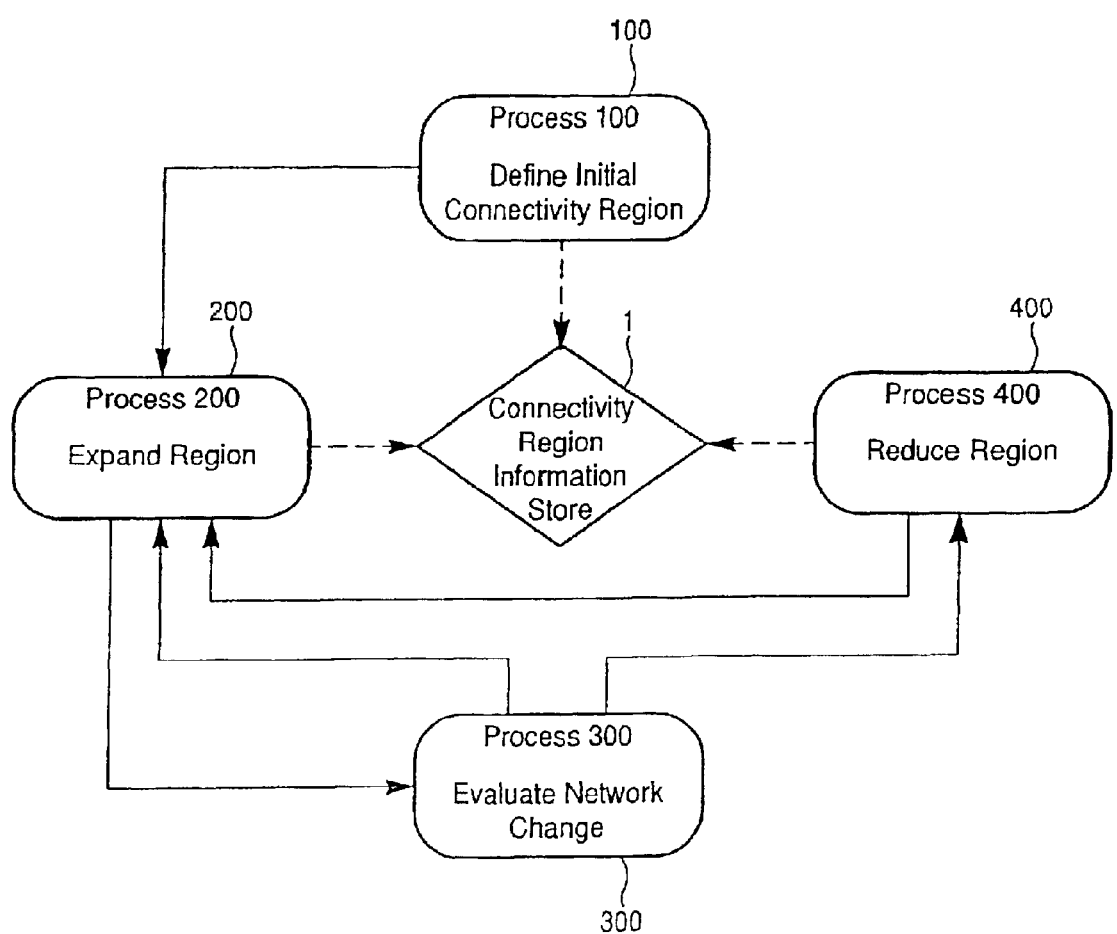
FIG. 1 is a process diagram showing an overview of the processes involved to define connectivity regions and their continued interaction within dynamic networks.

In order to facilitate comprehension of the figures used herein, several definitions must first be explained. In the figures herein, all rectangles with rounded corners symbolize a process occurring, each specific process is described fully herein. Information stores are depicted as a diamond shape; a dashed line with a hollow arrowhead indicates the flow of information initializing an information store. A dashed line with a stick arrowhead illustrates the procedure of storing or removing information within or from an Information Store. If the arrow points toward the Information Store, then the previous operation is storing information within the information store, conversely, if the arrow points away from the information store, a removal operation from the information store has occurred. In the figures, a solid line with a solid arrowhead indicates the direction of the process flow. A dashed line indicates a query of an information store. Questions or decision points usually query information stores to obtain information for making a decision. All rectangles with square corners are action steps within a process. Decision points or questions, such as Step 202 discussed herein, are denoted by an eight-sided polygon FIG. 1 depicts an overview of the invention and the interrelation of processes 100, 200, 300, 400 used to define a connectivity region (not shown). First, in Process 100, an initial connectivity region is created according to a process described in more detail with reference to FIG. 2. The initial connectivity region is then deposited within a connectivity region information store 1. The connectivity region information store 1 is such that the current configuration of the system and interrelation of the elements are stored within any memory device for retrieval at a later time. Examples of memory devices include, but are not limited to, a CPU, a logbook, an individual, a Plexiglas™ schematic of the system, etc.

After the initial connectivity region is created and stored in the connectivity region information store 1, Process 200 is initiated to expand the initial connectivity region, according to a detailed procedure described with reference to FIG. 3. Once Process 200 has finished expanding the connectivity region, the updated connectivity region is stored in the connectivity region information store 1; and Process 300 monitors for changes in the status of the network. The initialization sequence is depicted in FIG. 1 by dotted lines with a solid arrowhead.

At Process 300, the present invention awaits a network change requiring an expansion or reduction of the connectivity region. Process 300 evaluates the effect of a network action on the region; and based on the evaluation results obtained, either expands the connectivity region through Process 200 or reduces the connectivity region through Process 400. Any changes made to the connectivity region in Processes 200 and 400 are stored in the connectivity region information store 1.

Processes 200, 300, and 400 are constantly operating and adjusting connectivity regions to ensure integrity and continuity through the entire network. The operating and adjusting processes are preferably accomplished through electric and/or mechanical sensors and/or switches; however, the process may be also effectuated by any means wherein one or more conditions can be expressed or sensed. Likewise, the evaluation and storage of information is preferably accomplished through a CPU or other memory device with computation abilities; however, the evaluation and storage of information is not limited to CPUs but may also be accomplished through alternative means, such as an individual. For example, after the present invention reduces a connectivity region via Process 400, the present invention then automatically attempts to further expand the connectivity region through Process 200. Subsequently, Process 200 detects and repairs abnormalities obtained by reducing the connectivity region. Meanwhile, Process 300 continues to monitor for a change in the network.

Before describing each individual process, several terms common to all must be defined. First, within the present invention, a boundary is defined as any network component whose current position prevents network flow. In a fluid network, a closed valve is an example of a boundary because it prohibits the flow of fluid. Similarly, an open switch in a power distribution system is also a boundary because it prevents the flow of current.

Figure 6:
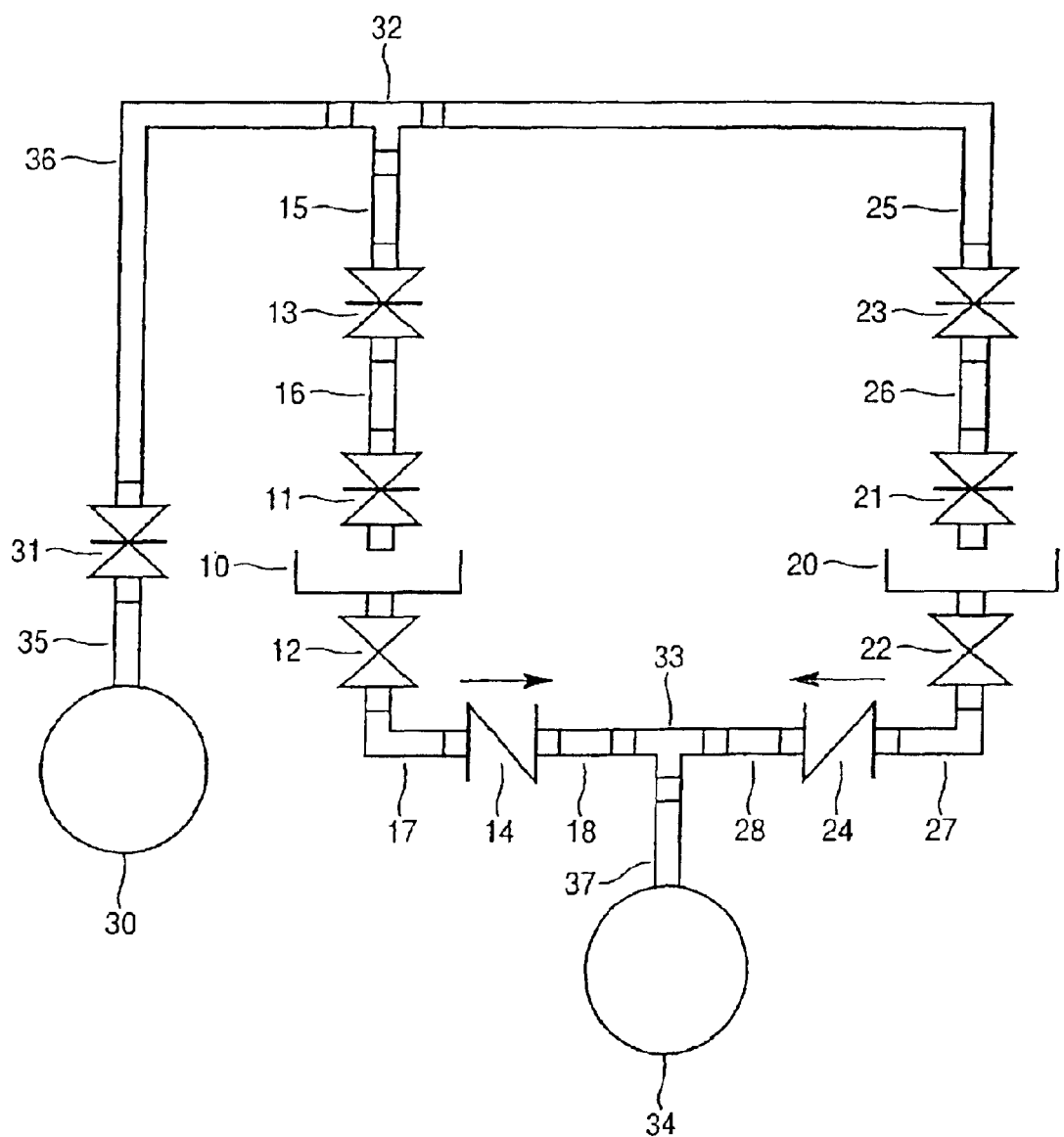
FIG. 6 is a diagram of the components within a sample flow network.

Next, neighbors are those components directly connected to a specific network component. Referring to FIG. 6, the neighbors of Sink 10 are Faucet 11 and Drain 12.

Finally, a trigger is any network component wherein the potential to restrict network flow exists. This usually requires an input from an operator. A configuration that is changeable by the operator suggests that the network component, when changed by an operator, will physically alter the network's current state. However, there is one exception that will be discussed in detail herein. Referring to FIG. 6, Faucet 11 and Drain 12 are triggers, whereas Check Valves 14 and 24 are not triggers because check valves are not changeable components. Identification of triggers within the network system is critical to the present invention's ability to expand and reduce connectivity regions. All components within a connectivity region are associated with a trigger. Upon the need to reduce or expand a connectivity region, the trigger information is used to determine which components will be removed, thus, eliminating the need to destroy and reconstruct the connectivity region.

Boundaries and triggers are similar in that they involve components that prevent or have the potential to prevent network flow. Triggers are required to have a configuration that is changeable by the operator while boundaries do not require such inputs.

Referring to FIG. 6, the example used to illustrate the concepts herein is a simple plumbing network. Water comes in from the Water Main 30 to a Main Shutoff Valve 31 and then splits into two paths at Tee 32. Each path from Tee 32 contains a Shutoff Valve 13, 23, pipe 16, 26, a Faucet 11, 21, a Sink 10, 20, a Drain 12, 22, pipe 17, 27 and a Check Valve 14, 24 to prevent backflow. The two paths meet again at Tee 33 and continue on to the sewer 34. The Water Main 30 and the Sewer 34 are considered Boundaries because they prevent the flow within the network. Whereas, the Main Shutoff Valve 31, both Shutoff Valves 13, 23, and both Faucets 11, 21 are triggers in that the operator may change the flow of the network by opening them. A component may be both a trigger and a boundary depending on their function, i.e., Faucet 11 and 21.

The following procedure will be executed on the plumbing network to demonstrate the processes herein:

1. Open Faucet 11
2. Open Shutoff 13
3. Open Main Shutoff 31
4. Close Drain 12
5. When Sink 10 is full, shut Faucet 11 to stop flow, then
6. Open Drain 12 to empty Sink 10

Figure 2:
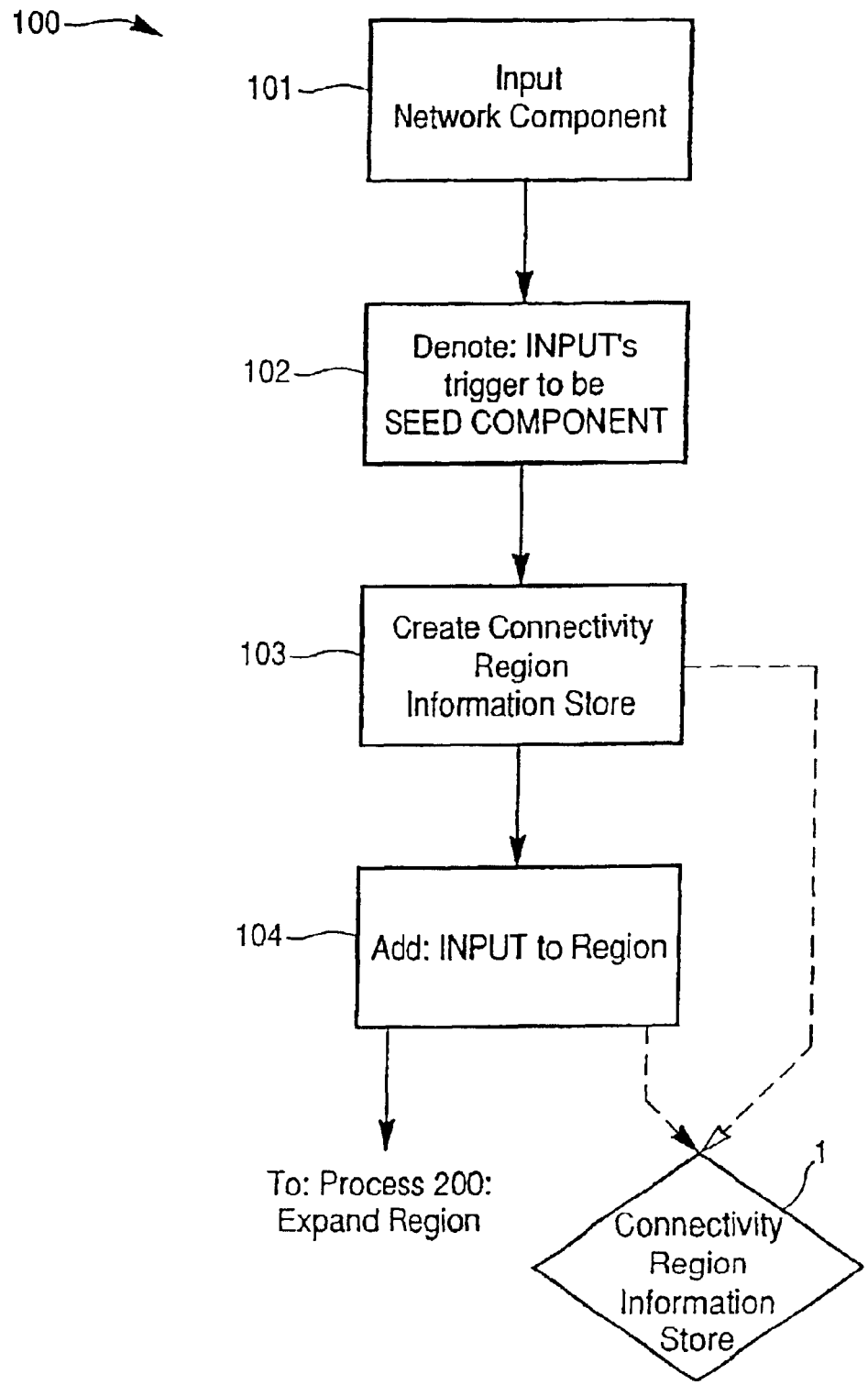
FIG. 2 is a process diagram of Process 100, defining an initial connectivity region.

FIG. 2 depicts Process 100, the first step in defining an initial connectivity region. In order to construct a connectivity region, the operator must input a network component around which to generate a region. This commences Process 100. The network component input is considered the Seed Component, or initial component, Step 101. The Seed Component serves as the base from which the connectivity region will grow. The Seed Component, regardless of the type of component, is denoted as a trigger. This is the sole exception mentioned above while defining triggers. Since all regions are derived from a single Seed Component, that Seed Component must be identified as a trigger.

Step 102 identifies Seed Component's trigger as Seed Component. In step 103, the connectivity region information store 1 is created. The components placed in the information store will comprise the connectivity region. Step 104 then adds the seed component to the connectivity region information store. After completion of Step 104, Process 100 terminates and Process 200 is initiated to expand the connectivity region.

In the example, the goal is to fill Sink 10. The operator then chooses Sink 10 as the initial input around which the connectivity region will be generated. Step 101 designates the Seed Component as Sink 10. Step 102 identifies Sink's 10 trigger as the Seed Component, Sink 10. Step 103 creates the connectivity region information store 1 and Step 104 adds Sink 10 into the connectivity region information store 1.

Figure 3:
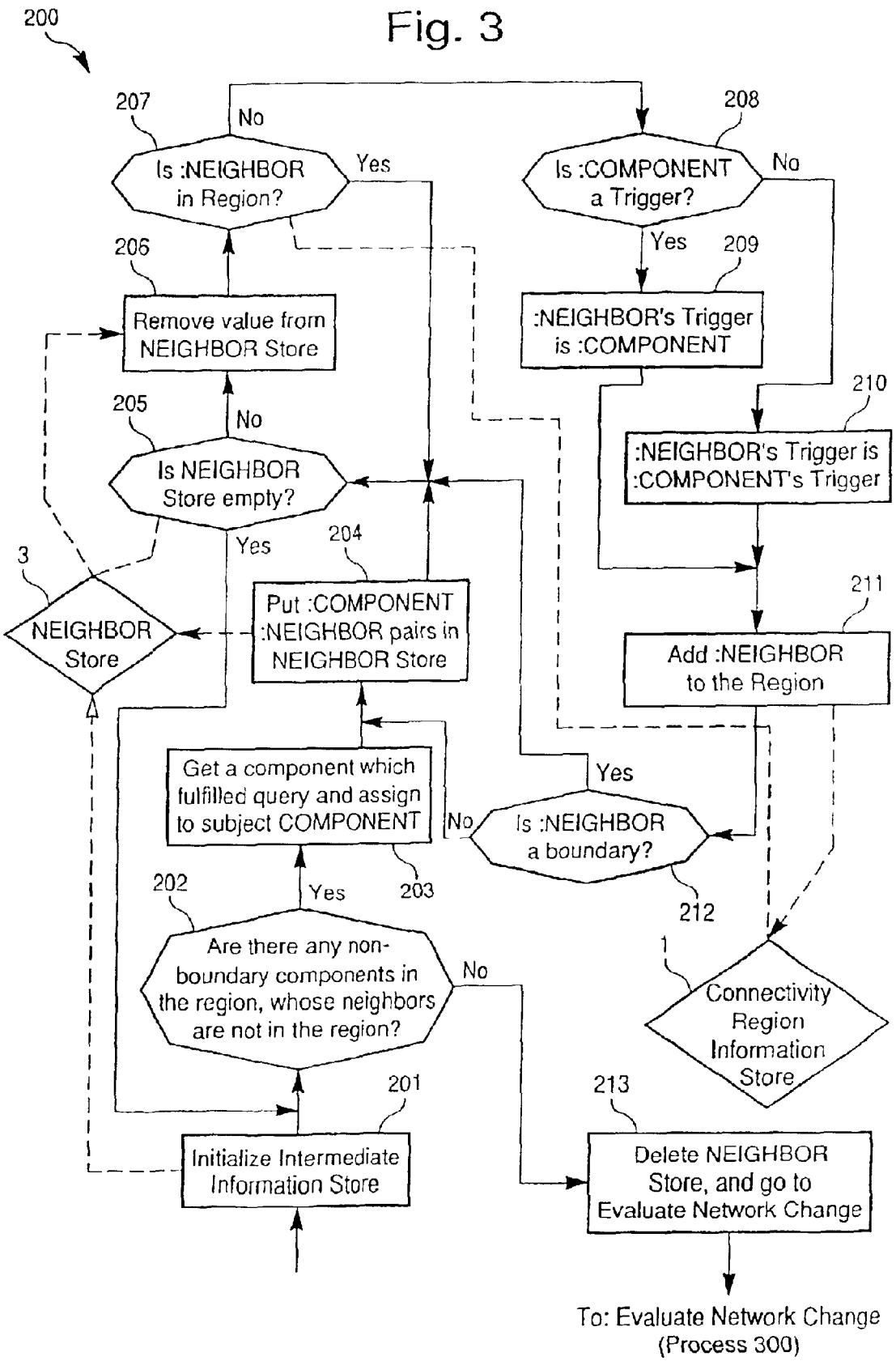
FIG. 3 is a process diagram of Process 200, expanding a connectivity region.

FIG. 3 shows Process 200, wherein the connectivity region is expanded. Process 200 is used during the initial connectivity region identification after identifying a Seed Component and when initiated by Process 300's detection of a network change requiring an expansion of the region. Once initiated, Process 200 requires no additional input information.

Step 201 initializes an intermediate information store called the neighbor store 3. The neighbor store 3 is used to maintain information regarding the expansion of the region, and to indicate when expansion is complete.

A query of the connectivity region is made to determine whether there are any network components in the region that are not region boundaries and whose neighbors are not in the region, this is step 202. If it is determined that such components exist, then Step 203 is performed, otherwise Step 213 is executed. Step 202 is looking for "loose ends" that need to be organized. When a boundary component changes and the end result allows for region expansion, or creates a new region, the query at Step 202 is used to identify which components to expand. All questions are either answered yes or no, leaving only two paths from which to emerge.

At Step 203, a component satisfying Step 202 is designated as the subject component. To reach Step 203, the query in Step 202 must have identified at least one component that is not a boundary and is within the region. Since the subject component is within the region, it already has a corresponding trigger associated with it. Step 204 then places the subject component and its respective neighbor components as pairs in the neighbor store 3. If Step 203 was immediately prior to Step 204, then it is the subject component and all of its neighboring components are added as pairs to the neighbor store. If Step 212 was executed just prior to Step 204, then the neighbor components of the subject component and all of their neighboring components are added to the neighbor store. This provides Process 200 with a set of candidates from which to expand.

Step 205 queries the neighbor store 3, looking for a subject component from which to expand the region. If the neighbor store 3 is empty, Step 202 is performed seeking again to expand. If the neighbor store 3 has either a subject component pair or a subject neighbor pair stored within, Step 206 removes the pair from the neighbor store and proceeds to Step 207.

Step 207 determines whether the neighbor component of a subject component in the neighbor store is already within the connectivity region. If that neighbor component is within the region already, then Step 205 is performed. In this instance, there is no reason to expand since the neighbors of that neighbor component will already be included within the connectivity region. However, if that neighbor component is not already within the region, Step 208 is performed.

In order to add a neighbor component into a connectivity region, a trigger must first be associated with the subject component. Steps 208, 209, and 210 are used to associate a trigger with each component added to a connectivity region. Step 208 looks at the subject component of a pair to determine whether that component is a trigger or not. If it is a trigger, then Step 209 is performed and the neighbor component's trigger is set as the subject component. If the subject component is not a trigger, then Step 210 designates the neighbor component's trigger as the same trigger as the subject component's trigger.

In Step 211, adding the subject component's neighbor to the region by storing that component within the connectivity region information store 1, expands the connectivity region. The connectivity region may possibly expand further if the recently added neighbor component's neighbors are not within the region. If the neighbor component in Step 211 is not a boundary, then the process returns to Step 204 to add the neighbor component and its neighbors into the neighbor store 3. If, however, the neighbor component is a boundary, then the region does not expand and the process returns to Step 205 to extract another pair of components from the neighbor store 3. The new pair of components extracted continues in the same sequence as detailed above.

Once the neighbor store 3 is empty, as determined in Step 205, the process returns to Step 202 where again the query is performed. If no network component satisfies the query, then the process continues to Step 213, wherein the neighbor store 3 is deleted and the network signals Process 300 to monitor for a change in the network. Process 300 is discussed in greater detail herein.

To further illustrate Process 200, a connectivity region will be formed around Sink 10 in the exemplary embodiment of FIG. 6. Process 200 initiates once Process 100 has been completed. Step 201 initializes the neighbor store 3. Step 202 is performed and Sink 10 is designated as the subject component Sink's 10 neighbors are Drain 12 and Faucet 11. These components are placed in the neighbor store as pairs, i.e., Sink 10: Drain 12 and Sink 10: Faucet 11. In Step 205, the neighbor store 3 is not empty, therefore Process 200 continues to Step 206.

A pair of components is removed from the neighbor store, e.g., Sink 10: Faucet 11. Again, the subject component is Sink 10 and the neighbor component is Faucet 11. Since Faucet 11 is not within the region, Step 207 proceeds to Step 208.

Step 208 determines the trigger for Faucet 11. Since Sink's 10 trigger is Sink 10, then Step 209 assigns Faucet's 11 trigger as Sink 10. Step 211 finally adds Faucet 11 to the connectivity region.

Since Faucet 11 is closed, then it is a boundary within the region and Step 212 sends the process back to Step 205 where expansion continues. There remains a pair in the neighbor store 3, specifically, Sink 10: Drain 12.

The processing of Drain 12 is similar to Faucet 11. Drain 12's trigger is also set as Sink 10 and is added to the region. However, at Step 212, Drain 12 is open, therefore Drain 12 is not a boundary of the region. Instead of proceeding to Step 205, the process goes again to Step 204 where the neighbors of Drain 12, namely Sink 10 and Pipe 17 are added to the neighbor store 3.

Figure 7:
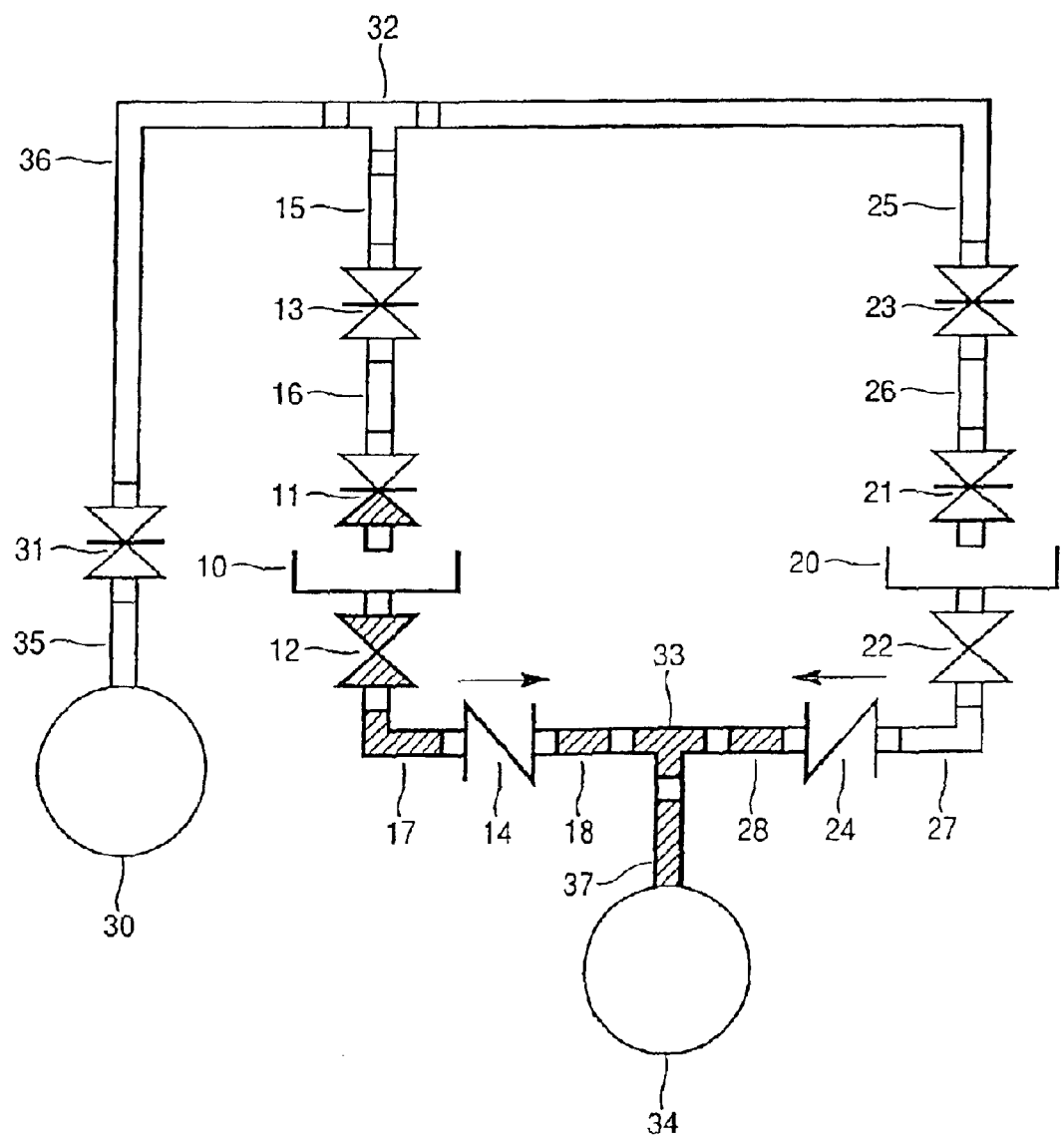
FIG. 7 is a diagram of the sample flow network after an initial connectivity region has been defined around Sink-1 10.

The procedure continues to add components to the connectivity region until the region is defined. The initial connectivity region for the above example is depicted in both FIG. 7 as the shaded area and Table 1 below:

TABLE 1

| Initial Connectivity Region | | | |
|---|---|---|---|
| Component | Trigger | Boundary? | Trigger? |
| Sink 10 | Sink 10 | | ✓ |
| Faucet 11 | Sink 10 | ✓ | ✓ |
| Drain 12 | Sink 10 | | ✓ |
| Pipe 17 | Drain 12 | | |
| Valve 14 | Drain 12 | | |
| Pipe 18 | Drain 12 | | |
| Tee 33 | Drain 12 | | |
| Pipe 37 | Drain 12 | | |
| Sewer 34 | Drain 12 | ✓ | |
| Pipe 28 | Drain 12 | | |
| Valve 24 | Drain 12 | ✓ | |

Once the initial region is determined via Process 100 and Process 200, the present invention monitors the network awaiting a network event to occur. When an event occurs, Process 300 examines the action and the component involved with the event. If the component's action has an effect on a connectivity region, Process 300 determines whether the region should be expanded or reduced.

Figure 4:
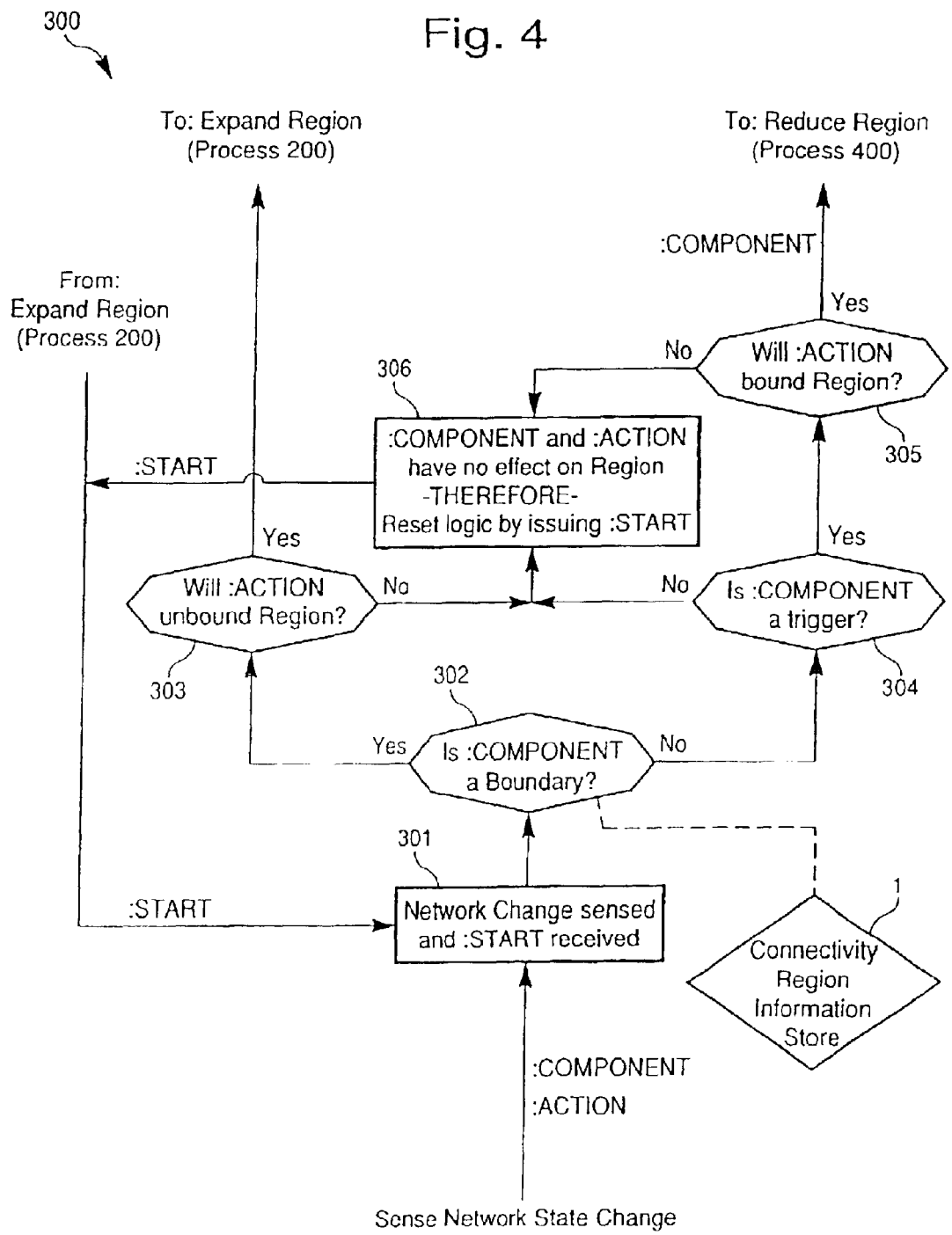
FIG. 4 is a process diagram of Process 300, evaluating a change or detecting an event within a network.

Referring to FIG. 4, once initiated, Process 300 is aware that a network action has taken place and that a network component is associated with that action. The first step in the process, Step 301, senses a change in the network and receives the logic from Process 200. Step 302 asks whether the component involved in the network change is one already within the connectivity region. If the answer is 'yes', then the process proceeds to Step 303, otherwise, if the answer is 'no', the process proceeds to Step 304.

Upon deciding that the component is already a boundary of the connectivity region, Step 303 determines whether the action associated with the component will unbound the region allowing for expansion. If the component no longer bounds the region, then Process 300 initiates Process 200 to expand the region. If not, then Process 300 continues to Step 306.

Step 304 determines if the component is a trigger. If the component is a trigger, then Step 305 determines whether the action will cause the component to now bound the region. If the action causes the component to bound a region, then Process 300 terminates and Process 400 begins to reduce the region. If the action will not cause the component to bound the region, then the process continues to Step 306.

There are three ways possible, described above, wherein the process may arrive at Step 306. No matter how arriving there, the end result is the same, the action, or network event, had no effect on the region. Therefore, the process returns to Step 301 and awaits the next network event.

Figure 8:
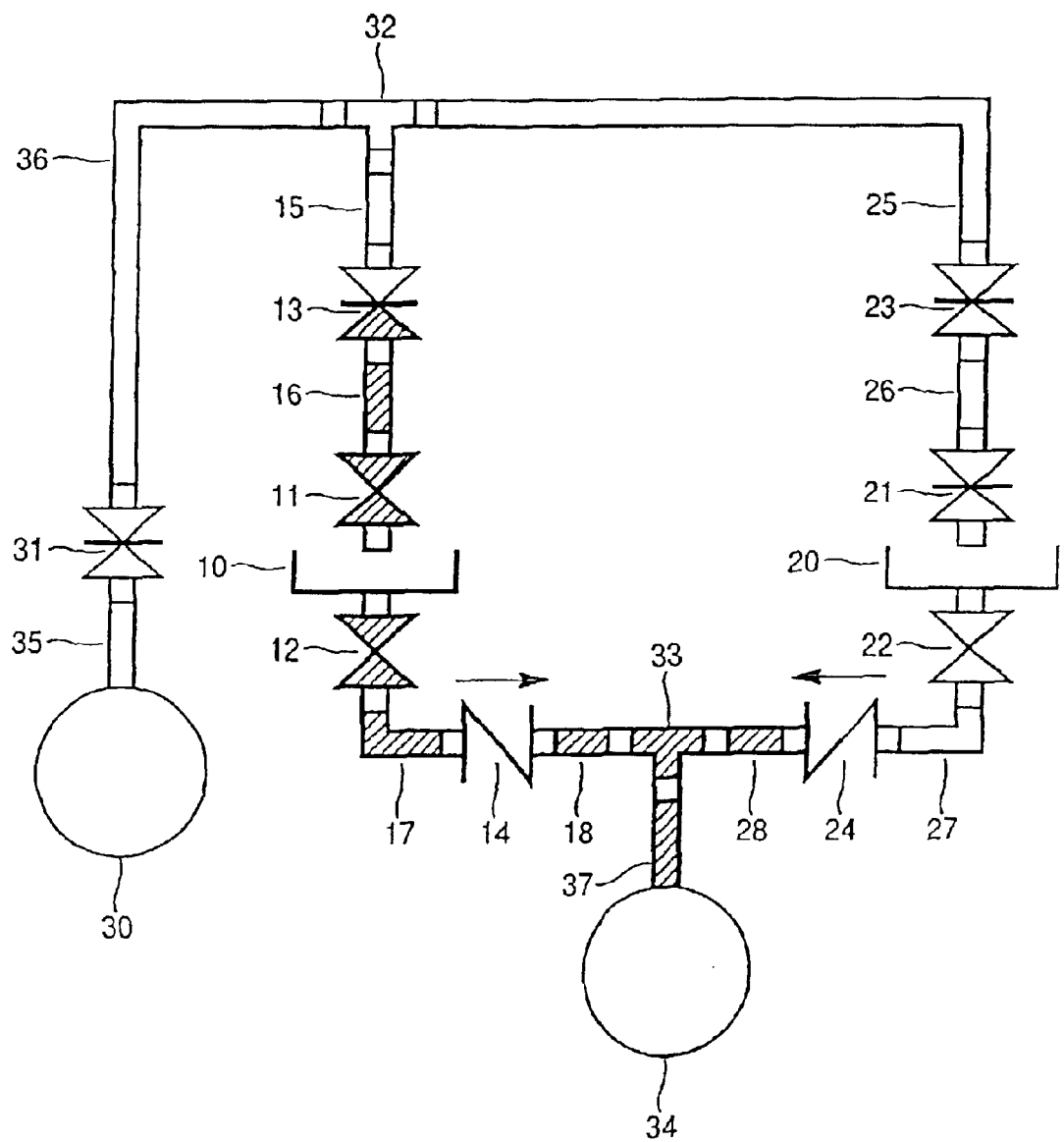
FIG. 8 is a diagram of the sample flow network after opening Faucet-1 11 and the resulting modified connectivity region.

In the example, referring to FIGS. 4 and 8, the network event is an operator opening Faucet 11. After determining the initial connectivity region, Process 200 sends the start logic to Step 301. The network event of opening Faucet 11 begins Process 300. Faucet 11 is designated as component and Open is the associated action.

At Step 302, the process denotes that Faucet 11 is a region boundary, taken from Table 1. Opening Faucet 11 will cause the region to become unbound, so Step 303 terminates Process 300 and initiates Process 200 to expand the region.

The new connectivity region is defined in Table 2 below and depicted in FIG. 8 as the shaded region:

TABLE 2

Connectivity Region after Opening Faucet 11

| Component | Trigger | Boundary? | Trigger? |
|---|---|---|---|
| Sink 10 | Sink 10 | | ✓ |
| Faucet 11 | Sink 10 | | ✓ |
| Drain 12 | Sink 10 | | ✓ |
| Pipe 17 | Drain 12 | | |
| Valve 14 | Drain 12 | | |
| Pipe 18 | Drain 12 | | |
| Tee 33 | Drain 12 | | |
| Pipe 37 | Drain 12 | | |
| Sewer 34 | Drain 12 | ✓ | |
| Pipe 28 | Drain 12 | | |
| Valve 24 | Drain 12 | ✓ | |
| Pipe 16 | Faucet 11 | | |
| Shutoff Valve 13 | Faucet 11 | ✓ | ✓ |

Figure 9:
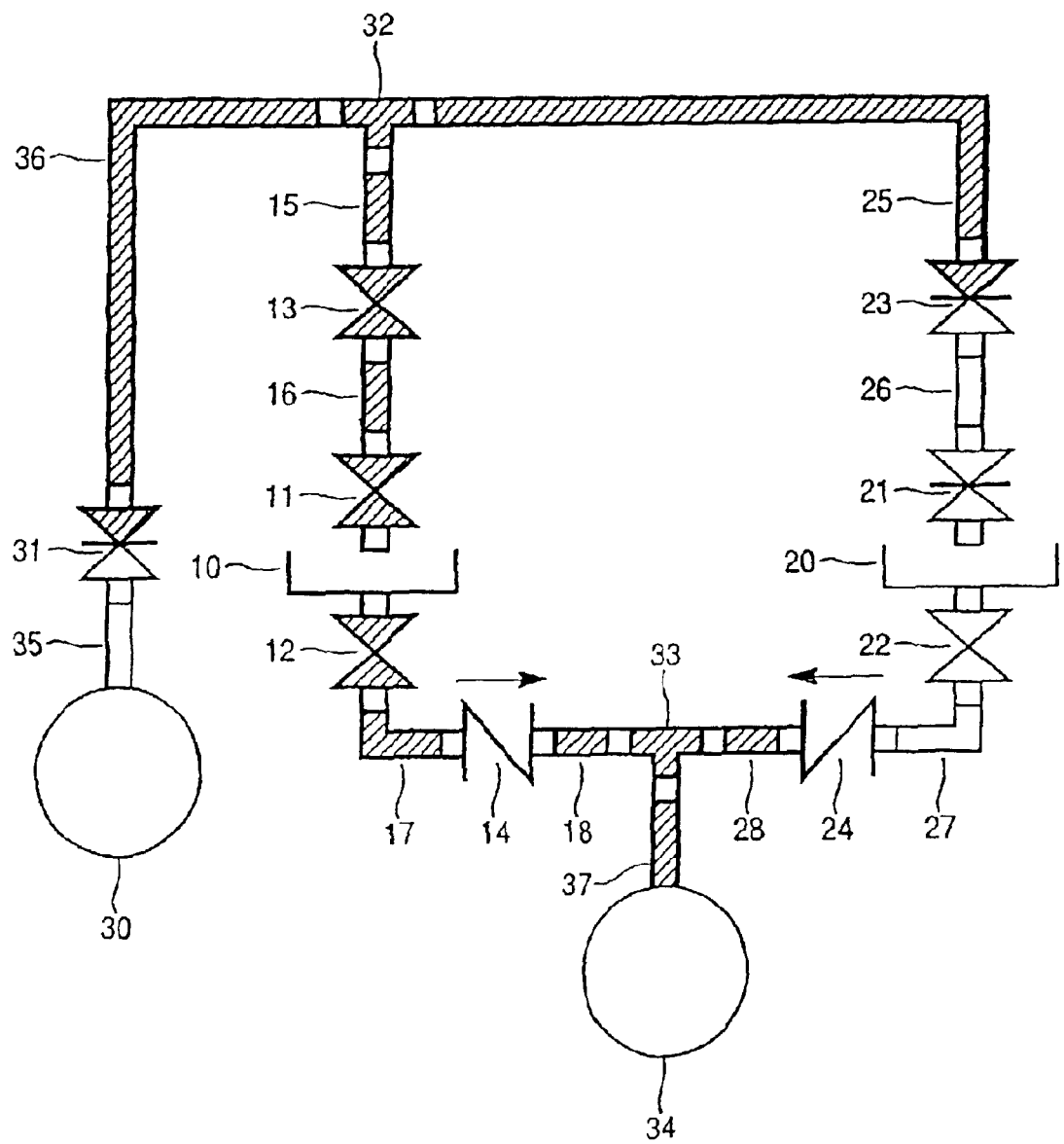
FIG. 9 is a diagram of the sample flow network after opening Shutoff Valve-1 13 and the resulting modified connectivity region.
Figure 10:
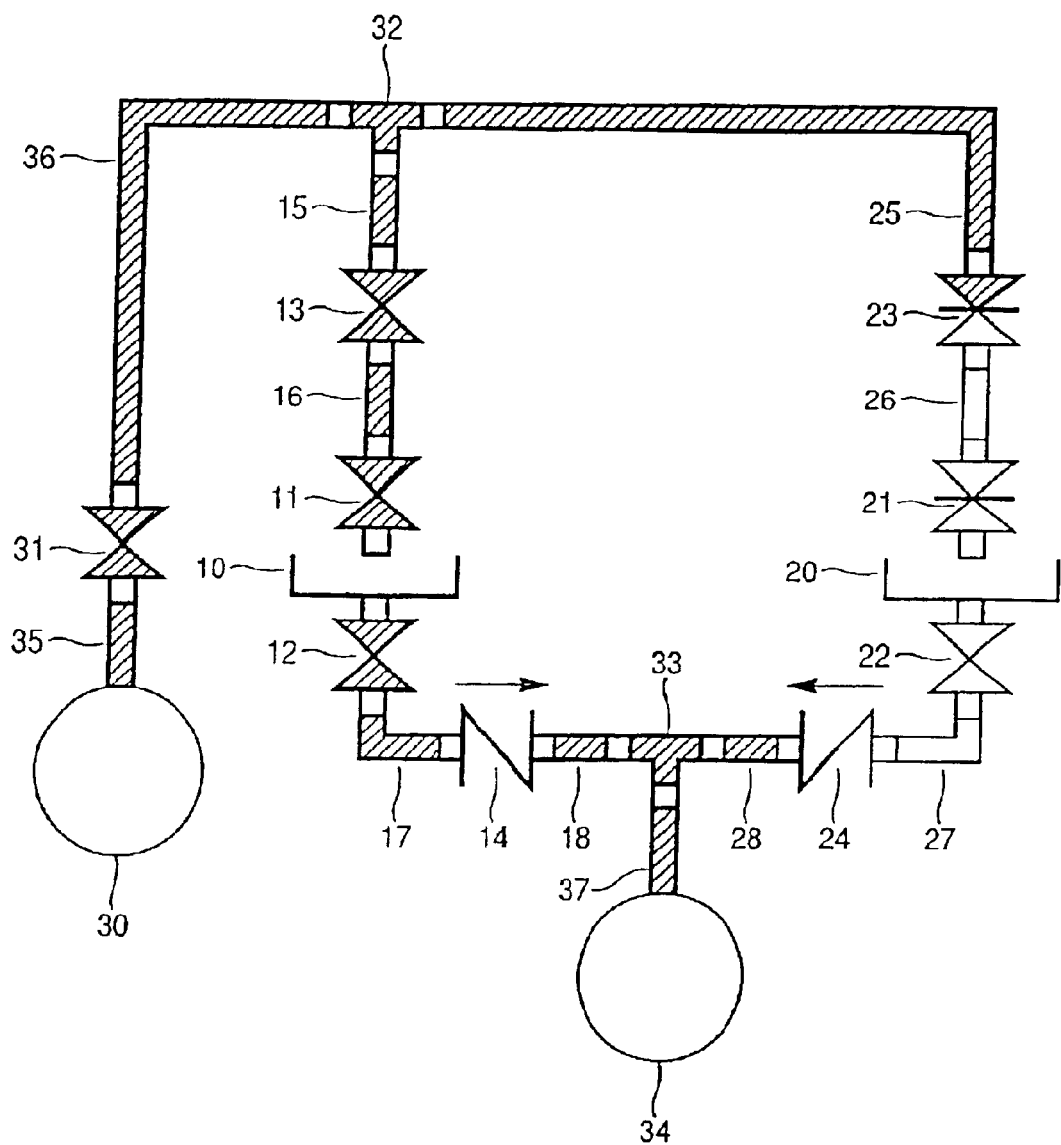
FIG. 10 is a diagram of the sample flow network after opening Main Shutoff Valve 31 and the resulting modified connectivity region.

The next two steps of the example procedure also involve opening valves, i.e., Shutoff Valve 13 and Main Shutoff Valve 31. The results of such action on the connectivity region are defined in Tables 3 and 4 below, as well as the shaded regions in FIGS. 9 and 10:

TABLE 3

Connectivity Region after Opening Shutoff Valve 13

| Component | Trigger | Boundary? | Trigger? |
|---|---|---|---|
| Sink 10 | Sink 10 | | ✓ |
| Faucet 11 | Sink 10 | | ✓ |
| Drain 12 | Sink 10 | | ✓ |
| Pipe 17 | Drain 12 | | |
| Valve 14 | Drain 12 | | |
| Pipe 18 | Drain 12 | | |
| Tee 33 | Drain 12 | | |
| Pipe 37 | Drain 12 | | |
| Sewer 34 | Drain 12 | ✓ | |
| Pipe 28 | Drain 12 | | |
| Valve 24 | Drain 12 | ✓ | |
| Pipe 16 | Faucet 11 | | |
| Shutoff Valve 13 | Faucet 11 | | ✓ |
| Pipe 15 | Shutoff Valve 13 | | |
| Tee 32 | Shutoff Valve 13 | | |
| Pipe 25 | Shutoff Valve 13 | | |
| Shutoff Valve 23 | Shutoff Valve 13 | ✓ | ✓ |
| Pipe 36 | Shutoff Valve 13 | | |
| Main Shutoff Valve 31 | Shutoff Valve 13 | ✓ | ✓ |

TABLE 4

Connectivity Region after Opening Main Shutoff Valve 31

| Component | Trigger | Boundary? | Trigger? |
|---|---|---|---|
| Sink 10 | Sink 10 | | ✓ |
| Faucet 11 | Sink 10 | | ✓ |
| Drain 12 | Sink 10 | | ✓ |
| Pipe 17 | Drain 12 | | |
| Valve 14 | Drain 12 | | |
| Pipe 18 | Drain 12 | | |
| Tee 33 | Drain 12 | | |
| Pipe 37 | Drain 12 | | |
| Sewer 34 | Drain 12 | ✓ | |
| Pipe 28 | Drain 12 | | |
| Valve 24 | Drain 12 | ✓ | |
| Pipe 16 | Faucet 11 | | |
| Shutoff Valve 13 | Faucet 11 | | ✓ |
| Pipe 15 | Shutoff Valve 13 | | |
| Tee 32 | Shutoff Valve 13 | | |
| Pipe 25 | Shutoff Valve 13 | | |
| Shutoff Valve 23 | Shutoff Valve 13 | ✓ | ✓ |
| Pipe 36 | Shutoff Valve 13 | | |

TABLE 4-continued

Connectivity Region after Opening Main Shutoff Valve 31

| Component | Trigger | Boundary? | Trigger? |
|---|---|---|---|
| Main Shutoff Valve 31 | Shutoff Valve 13 | | ✓ |
| Pipe 35 | Main Shutoff Valve 31 | | |
| Water Main 30 | Main Shutoff Valve 31 | ✓ | |

In order to fill Sink 10, Drain 12 must be closed. At this point water is flowing from the Water Main 30, through the two Shutoff Valves 13, 31, through Faucet 11, into Sink 10, down Drain 12, and out to the Sewer 34. Closing Drain 12 allows Sink 10 to fill with water. Closing is a network action and is associated with component Drain 12.

In Step 301, the component is Drain 12 and the associated action is shut. Start logic has already been received from Process 200 when the Main Shutoff 31 was opened.

Since Drain 12 is not a boundary, Step 302 proceeds to Step 304 where Drain 12 is identified as a trigger. Consequently, in Step 305 the action of shutting Drain 12 will cause it to act as a boundary. Thus, Process 300 terminates and Process 400 begins to reduce the connectivity region in order to accommodate the network action.

Figure 5:
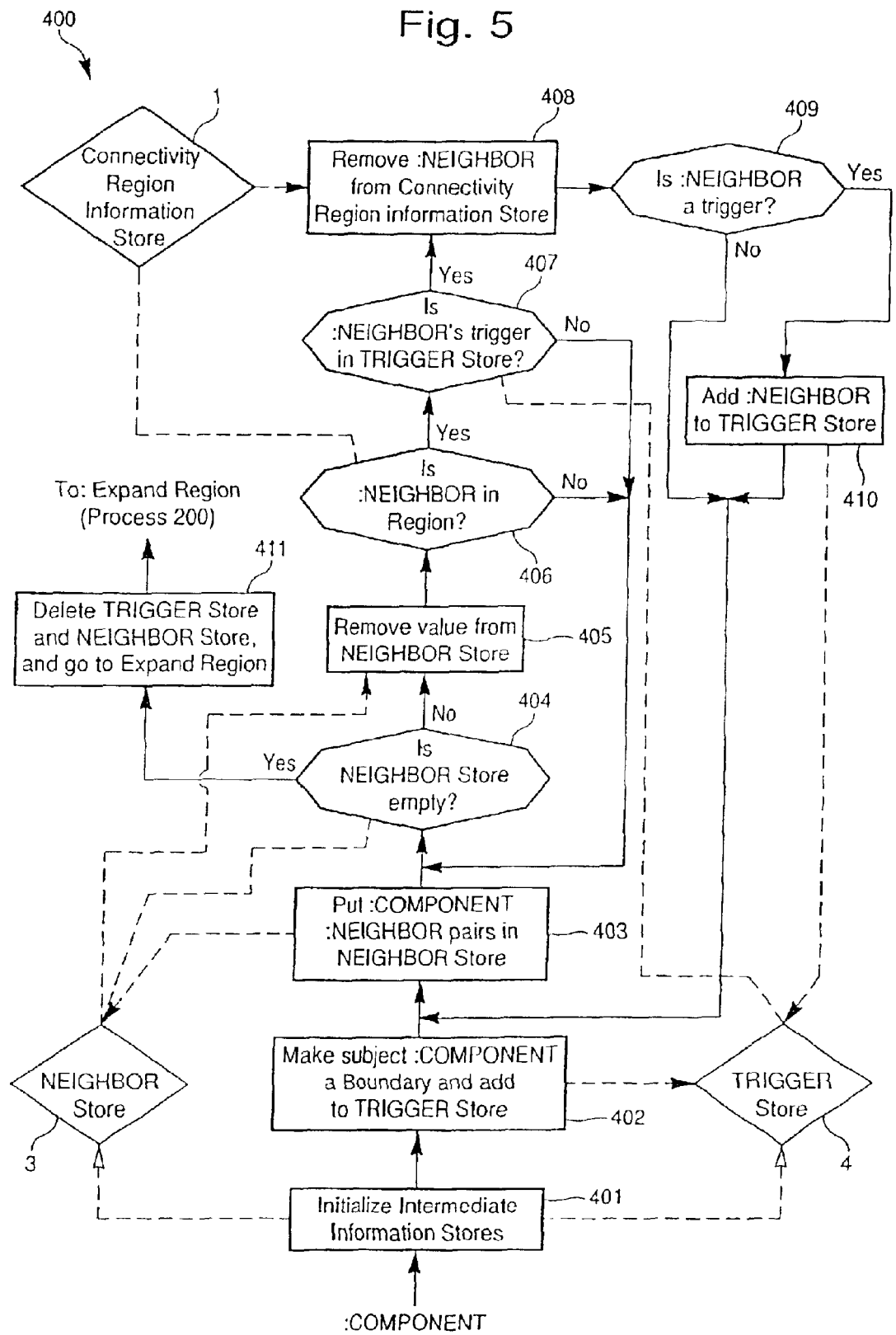
FIG. 5 is a process diagram of Process 400, reducing a connectivity region.

Referring now to FIG. 5, Process 400 is initiated when Process 300 determines that the previous network event causes the connectivity region to collapse. Reduction of the connectivity region is determined by the stored trigger information associated with each component. To reduce the region after shutting Drain 12, the present invention identifies those components that have Drain 12 as their trigger, since those components triggered by Drain 12 are going to be outside the connectivity region when Drain 12 is made a boundary.

Process 400 obtains the component that was involved with the network action. At Step 401, two information stores are used within the process, a neighbor store 3 and a trigger store 4. The trigger store 4 holds information used to determine which components are going to be excluded from a region as a result of a network action. The neighbor store 3 behaves similarly to the neighbor store 3 in Process 200, but here the components are candidates for removal from the region rather than expansion. Step 402 adds the subject component received from Process 300 to the trigger store 4 and denotes that subject component as a boundary.

At Step 403, information is added to the neighbor store 3 again as component: neighbor component pairs. If the previous step was either 409 or 410, then neighbor component and all of its neighbor components are added as pairs to the neighbor store 3. This provides Process 400 with a set of candidates for removal from the connectivity region.

The neighbor store 3 is queried in Step 404 to determine if there are any component pair candidates for removal. If the neighbor store 3 is empty, then the process continues on to Step 411. If there are component pairs within the neighbor store, the process continues to Step 405. At Step 405, a pair of components is removed from the neighbor store 3, and identified as subject component: neighbor component.

At Step 406, the connectivity region information store is queried to determine if the neighbor component is within the connectivity region. If a neighbor is not in the region, then the process returns to Step 404, since there is no need to remove a component not in the region. If the neighbor component is within the region, then the process executes Step 407.

The trigger store 4 is queried in Step 407 to determine if the neighbor component's trigger is within the trigger store 4. If the neighbor component's trigger is in the trigger store, then Step 408 is performed, otherwise the process returns again to Step 404. At Step 408 the neighbor component is removed from the connectivity region information store 1. Step 409 ascertains whether the neighbor component itself is a trigger. This check in Step 409 ensures that any components that are triggered by a removed component are also made candidates for removal from the connectivity region. If the neighbor component recently removed is a trigger, then Step 410 is performed to add the recently removed neighbor component to the trigger store 4; otherwise, the process returns to Step 403.

Process 400 continues removing components from the connectivity region until Step 404 determines that the neighbor store 3 is empty. Once empty, Step 411 terminates process 400 by deleting the neighbor store 3 and the trigger store 4. Since region reduction may potentially leave a region unstable, Process 400 then initiates Process 200 in order to expand and stabilize the connectivity region. This will ultimately redefine all of the connectivity regions within the network ensuring that the integrity of the regions is maintained.

In the fluid network example, once Drain 12 is shut, the connectivity region must be reduced. In Step 401, the two information stores are initiated and Drain 12 is added to the trigger store in Step 402. The neighbors of Drain 12 are Pipe 17 and Sink 10. The components are paired and placed in the neighbor store 3 as Drain 12: Pipe 17 and Drain 12: Sink 10.

Step 405 removes a pair from the neighbor store, Drain 12: Sink 10. The subject component is Drain 12 and the neighbor component is Sink 10. Since Sink 10 is already in the region, the procedure continues from Step 406 to Step 407.

Note, Sink's 10 trigger is Sink 10. In Step 407, it is verified that Sink 10 is not in the trigger store, therefore the procedure returns back to Step 404. However, there remains a pair of components in the neighbor store 3, so Step 404 continues on to Step 405 where the remaining pair, Drain 12: Pipe 17, is removed from the neighbor store 3.

Since Pipe 17 is within the region, and its trigger, Drain 12, is in the trigger store, Step 409 is executed. Step 409 examines whether the neighbor component, Pipe 17, is a trigger. Since Pipe 17 is not a trigger the process continues to Step 403. If the neighbor component had been a trigger then it would have been added to the trigger store 4. This step ensures that the removal of a trigger component will also cause the removal of those components for which it is a trigger.

It is noted that, had Faucet 11 been shut, Shutoff Valve 13, having Faucet 11 as a trigger, would have been removed. But, Shutoff Valve 13 is also a trigger for several other components. By adding Shutoff Valve 13 to the trigger store 4, a check is performed in Step 407 that would ensure those components triggered by Shutoff Valve 13 are also removed from the connectivity region.

Process 400 continues to execute until all components triggered by Drain 12 have been removed. Once the neighbor store 3 is empty, the neighbor store 3 and trigger store 4 are deleted and Process 200 is initiated. In networks containing loops and other complex configurations, region reduction can leave the connectivity region with unbound legs. Process 200 will detect such legs and expand until the region is once again bound.

Figure 11:
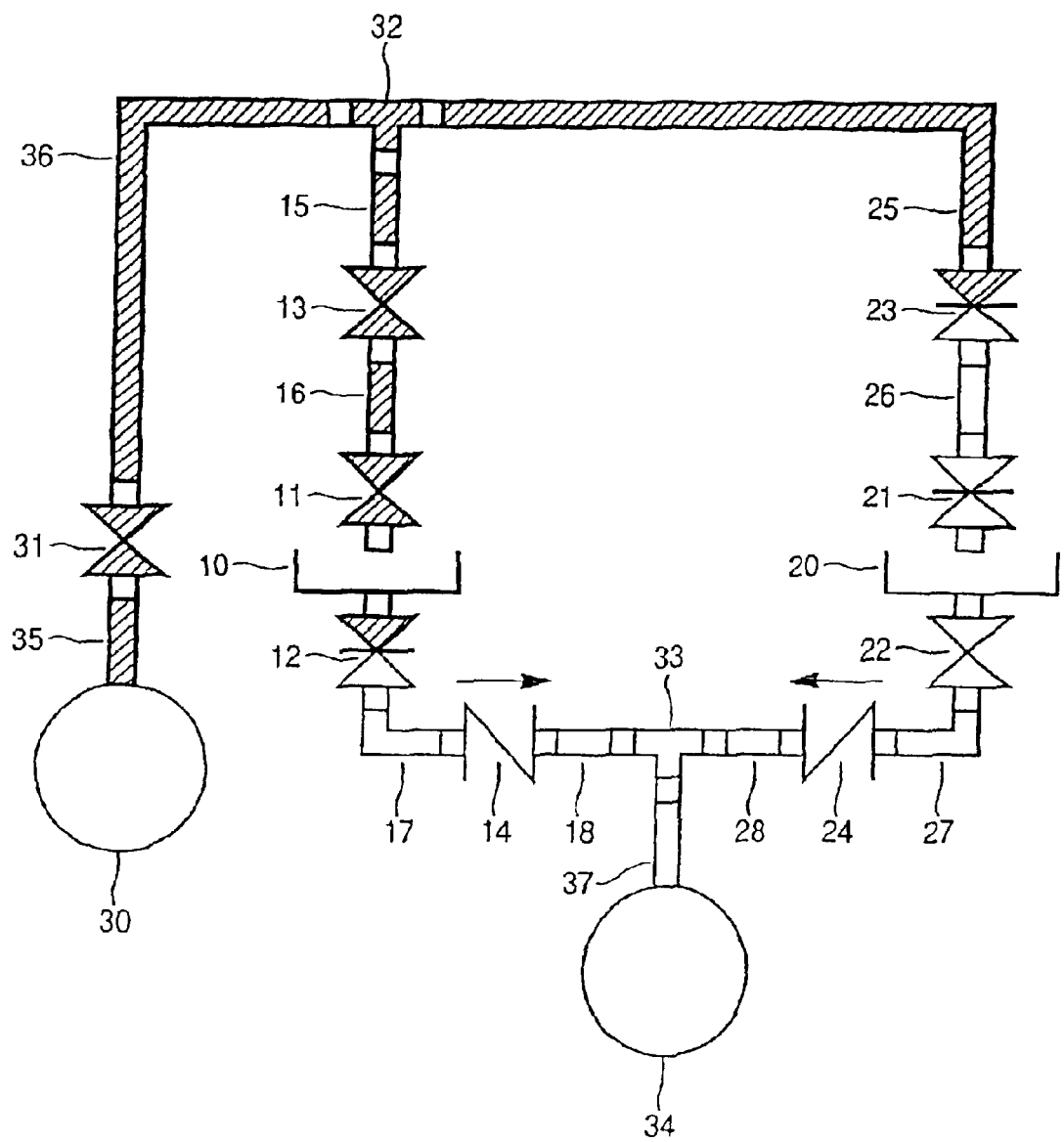
FIG. 11 is a diagram of the sample flow network after closing Drain-1 12 and the resulting modified connectivity region.

Table 5 below and the shaded region of FIG. 11 depict the connectivity region after Drain 12 has been shut.

TABLE 5

Connectivity Region after Closing Drain 10

| Component | Trigger | Boundary? | Trigger? |
|---|---|---|---|
| Sink 10 | Sink 10 | | ✓ |
| Faucet 11 | Sink 10 | | ✓ |
| Drain 12 | Sink 10 | ✓ | ✓ |
| Pipe 16 | Faucet 11 | | |
| Shutoff Valve 13 | Faucet 11 | | ✓ |
| Pipe 15 | Shutoff Valve 13 | | |
| Tee 32 | Shutoff Valve 13 | | |
| Pipe 25 | Shutoff Valve 13 | | |
| Shutoff Valve 23 | Shutoff Valve 13 | ✓ | ✓ |
| Pipe 36 | Shutoff Valve 13 | | |
| Main Shutoff Valve 31 | Shutoff Valve 13 | | ✓ |
| Pipe 35 | Main Shutoff Valve 31 | | |
| Water Main 30 | Main Shutoff Valve 31 | ✓ | |

The final step in filling Sink 10 is to close Faucet 11 when the water has reached a desired level. From Table 5, two components are triggered by Faucet 11, Pipe 16 and Shutoff Valve 13. Process 400 will remove these two components from the region. Once Shutoff Valve 13 is removed, Step 409 determines that Shutoff Valve 13 is a trigger and adds that component to the Trigger Store 4.

Figure 12:
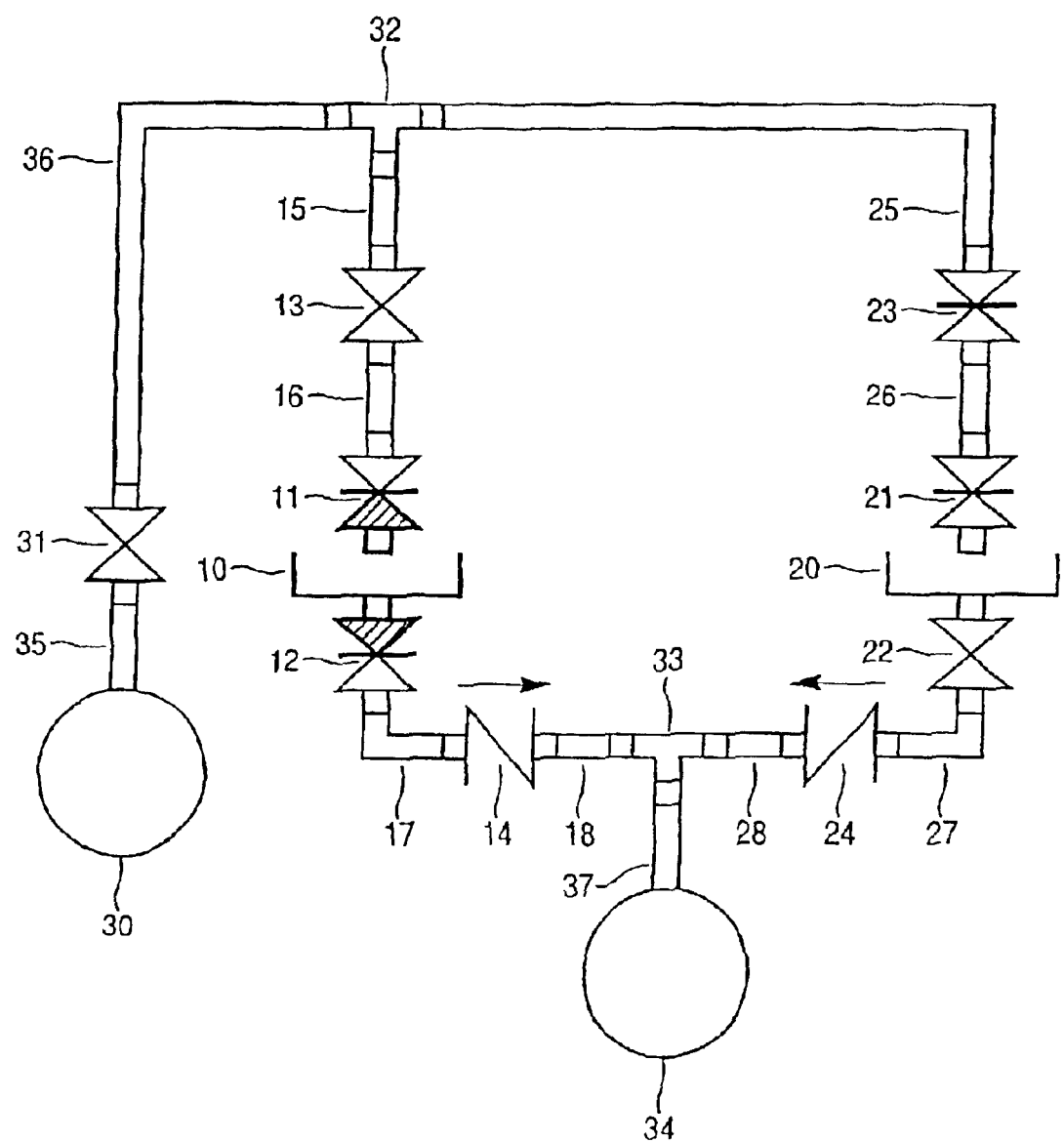
FIG. 12 is a diagram of the sample flow network after closing Faucet-1 11 and the resulting modified connectivity region.

Now at Step 407, there are two components in the trigger store 4, Faucet 11 and Shutoff Valve 13. By adding Shutoff Valve 13 to the trigger store, any component with Shutoff Valve 13 as a trigger will be removed from the region. Main Shutoff Valve 31 then gets added to the trigger store any component with Main Shutoff Valve 31 as a trigger will be removed from the region. The resulting connectivity region after closing Faucet 11 is found in Table 6 below and depicted as the shaded region in FIG. 12.

TABLE 6

Connectivity Region after Closing Faucet 11

| Component | Trigger | Boundary? | Trigger? |
|---|---|---|---|
| Sink 10 | Sink 10 | | ✓ |
| Faucet 11 | Sink 10 | ✓ | ✓ |
| Drain 12 | Sink 10 | ✓ | ✓ |

Figure 13:
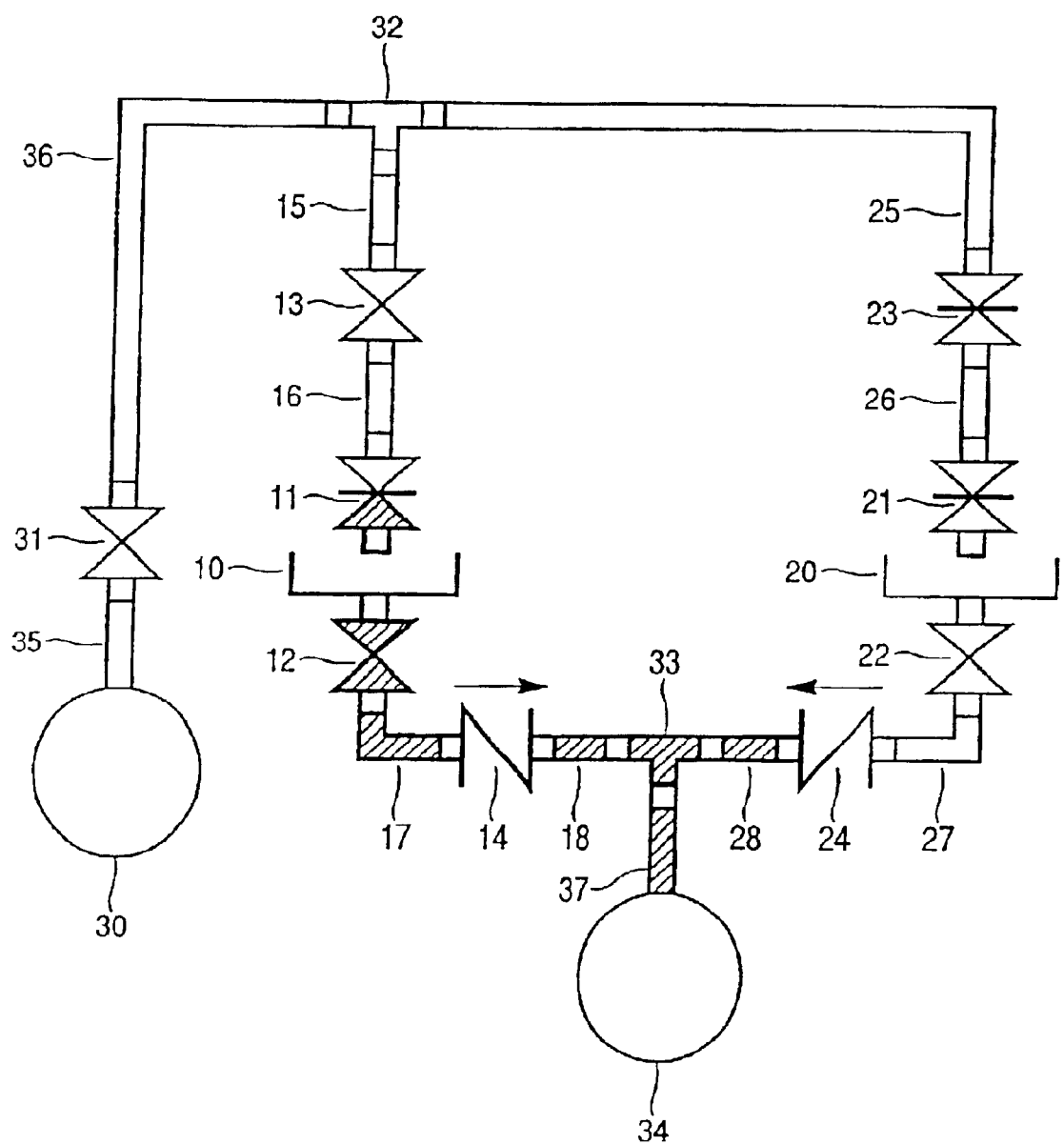
FIG. 13 is a diagram of the sample flow network after opening Drain-1 12 and the resulting modified connectivity region.

In order to empty Sink 10, Drain 12 must be opened. Process 300 determines that the action of opening Drain 12 will cause the region to expand. Thus, Process 200 is initiated to expand the connectivity region. Table 7 below and the shaded region in FIG. 13 depict the resulting connectivity region:

TABLE 7

Connectivity Region after Opening Drain 12

| Component | Trigger | Boundary? | Trigger? |
|---|---|---|---|
| Sink 10 | Sink 10 | | ✓ |
| Faucet 11 | Sink 10 | ✓ | ✓ |
| Drain 12 | Sink 10 | | ✓ |
| Pipe 17 | Drain 12 | | |
| Valve 14 | Drain 12 | | |
| Pipe 18 | Drain 12 | | |
| Tee 33 | Drain 12 | | |
| Pipe 37 | Drain 12 | | |
| Sewer 34 | Drain 12 | ✓ | |
| Pipe 28 | Drain 12 | | |
| Valve 24 | Drain 12 | ✓ | |

While the foregoing invention has been shown and described with reference to several preferred embodiments and arrangements, it will be understood by those of skill in the art that various changes in form and detail may be made therein without departing from the spirit and scope of the invention.

What is claimed is:

1. A method of evaluating a connectivity region defining a flow path within a system of at least two elements, comprising the steps of:

identifying an initial element within said system;

identifying all adjacent elements within said system that are adjacent to the initial element to establish an initial connectivity region;

evaluating flow status between said initial element and said adjacent elements;

examining said flow status between said adjacent elements and elements adjacent to said adjacent elements until a boundary is reached;

expanding said connectivity region when said flow status indicates an open flow path at said boundary of said connectivity region;

reducing said connectivity region when said flow status indicates a closed flow path from said initial element to said adjacent element within said connectivity region; and storing data regarding said initial and said adjacent elements.

2. The method of claim 1, wherein said step of storing data comprises electronically storing data within a memory device.

3. The method of claim 1, wherein said connectivity region is automatically updated depending on an ability of said elements included in said connectivity region to inhibit or to allow flow within said connectivity region.

4. The method of claim 1, wherein said step of storing data comprises the step of creating a first information set including a list of elements defining said connectivity region.

5. The method of claim 1, wherein said step of expanding comprises the steps of:

selecting a first chosen element from said first information set;

selecting an adjacent element of said first chosen element;

creating a pair from said first chosen element and said adjacent element; and storing data describing said pair in a second information set.

6. The method of claim 5, wherein said step of expanding further comprises the steps of:

selecting said pair from said second information set;

determining whether said adjacent element is within the connectivity region; and determining whether said first chosen element is a trigger element for said adjacent element wherein a trigger element has the ability to alter said flow status of other elements within said system.

7. The method of claim 1, wherein said step of expanding further comprises the steps of:

selecting a first chosen element from said first information set;

evaluating the flow status between said first chosen element and an adjacent element; and adding said adjacent element to said first information set if flow exists between said first chosen element and said adjacent element.

8. The method of claim 1, wherein said step of expanding further comprises the step of:

selecting a first chosen element from said second information set; and evaluating whether said element bounds said system.

9. The method of claim 1, wherein said step of expanding continues until all boundaries of said connectivity region have been attained.

10. The method of claim 1, wherein said step of reducing comprises the steps of:

selecting a second chosen element from said first information set;

identifying said second chosen element as a trigger;

adding said trigger into a third information store;

selecting an adjacent element of said second chosen element;

creating a pair from said second chosen element and said adjacent element; and storing data describing said pair in a second information set.

11. The method of claim 1, wherein said step of reducing further comprises the steps of:

selecting a second chosen element from a first information set;

selecting an adjacent element of said second chosen element;

evaluating the flow status between said second chosen element and said adjacent element;

determining whether said second chosen element is a trigger;

identifying a trigger as an element capable of changing a state of the connectivity region;

associating all elements within said connectivity region as being associated with at least one of said triggers; and removing said adjacent element from said first information set if flow does not exist between said second chosen element and said adjacent element, wherein when adjacent elements identified as triggers are moved, all elements associated with said trigger are removed.

12. The method of claim 1, wherein said evaluating flow status further comprises the steps of:

detecting a changed element wherein said flow status of said changed element is altered; and determining whether said flow path of the elements within said first information set resulting from said changed element now includes additional elements within said connectivity region.

13. The method of claim 1, wherein said evaluating flow status further comprises the steps of:

detecting a changed element wherein said flow status of said changed element is altered; and determining whether said flow path of the elements within said first information set resulting from said changed element requires a reduction of elements within said connectivity region.

14. The method of claim 1, further comprising the step of determining whether any element is a boundary element, wherein said boundary element prohibits flow.

15. The method of claim 1, wherein said flow path permits flow of at least one of fluid, current, electronic data, physical objects and energy.

16. The method of claim 1, further including the step of determining whether there are any elements in said connectivity region that are not region boundaries and whose neighbor elements are not in said connectivity region.

17. The method of claim 16, further including the steps of creating additional pairs comprising said any elements and their corresponding neighboring elements and adding said additional pairs to said second information set.

18. A method of determining a connectivity region defining a flow path within a system of at least two elements, comprising the steps of:

identifying an initial element within said system;

identifying an adjacent element within said system;

evaluating flow status between said initial element and said adjacent element; expanding said connectivity region when said flow status indicates an open flow path at a boundary of said connectivity region;

reducing said connectivity region when said flow status indicates a closed flow path within said connectivity region;

storing data regarding said initial and said adjacent elements;

storing data comprises the step of creating a first information set including a list of elements defining said connectivity region;

selecting a first chosen element from said first information set;

creating a pair from said first chosen element and an adjacent element;

storing data describing said pair in a second information set;

adding said adjacent element to said first information set if flow exists between said first chosen element and said adjacent element;

selecting a second chosen element from said first information set;

creating a pair from said second chosen element and an adjacent element;

storing data describing said pair in a second information set, selecting a second chosen element from said first information set;

removing said adjacent element from said first information set if flow does not exist between said second chosen element and said adjacent element;

detecting a changed element wherein said flow status of said changed element is altered;

determining whether said flow path of the elements within said first information set resulting from said changed element now includes additional elements within said connectivity region; and determining whether said flow path of the elements within said first information set resulting from said changed element requires a reduction of elements within said connectivity region.

* * * * *